Patented Dec. 10, 1940

2,224,163

UNITED STATES PATENT OFFICE 2,224,163

COLOR PHOTOGRAPHY

Virgil B. Sease, New Brunswick, and Deane R. White, South River, N. J., assignors to Du Pont Film Manufacturing Corporation, New York, N. Y., a corporation of Delaware No Drawing. Application March 20, 1937, Serial No. 132,144

3 Claims. (Cl. 95—2)

This invention relates to color photography and more particularly to an improved method for providing color photographic partial records required for either additive or subtractive processes.

One object of this invention is to provide chemical means for obtaining individual color separation records from superposed color component records. A further object is to provide a method whereby multipack photographic records may be extended to form at least one more individual color record than the number of films in the multipack. Another object is to provide chemical means whereby individual color component records may be obtained from integrally superposed records formed in multilayered monopacks. Further objects will more plainly appear from the detailed description that is presented in exemplification and not in limitation herein.

In the art of subtractive color photography many forms and modifications of multipack films have been suggested. In the simpler arrangements, one of the films records one region of colors of the scene while the other film records another region. In the tripack arrangements each element records a given portion of the colors representing the original color scale.

Many disadvantages are present in these forms of multipack. In the bipack arrangement, the separation of the color range photographed by the two differently-sensitized films is not sharp nor complete, as usually some portion of the color scale is recorded on both films; in the final print this effect inevitably leads to color dilution and lack of purity of color rendition. In the ordinary tripack arrangement, the separation of the color scale into individual color component records is never satisfactory as the image of the rear film lacks detail and sharpness due to the fact that it is separated physically from the front image by at least the thickness of one emulsion support. Furthermore, in printing, the image from the rear film is toned blue and represents the "drawing" of the scene, and this loss of sharpness is also highly undesirable. In order to minimize this loss of image sharpness, the art has suggested certain camera arrangements wherein the middle and rear films of the ordinary tripack are exposed as a bipack arrangement at one aperture of the camera while the front film is exposed at a second aperture. These cameras are cumbersome and expensive, and require vigilant checking to ensure that the intricate optical system required is in alignment. Such cameras are rarely adaptable for black and white photography, and have failed to fill the urgent need in the industry for an inexpensive and simplified process that will produce faithful color.

These and many other disadvantages of the prior art for providing individual component color records are eliminated by the invention hereinafter described. The present invention provides chemical means for obtaining at least three color-component records by simultaneous exposure in any ordinary camera either for still or motion picture photography. It is directed primarily to obtaining three component records because it is recognized that a minimum of three colors is required for the reproduction of natural color. By the methods hereinafter described, however, it is possible to obtain more than three individual color records from simultaneous exposures. The following descriptions are presented in exemplification of the invention and not in limitation thereof.

In a preferred form of the present invention a multipack film arrangement, in which one of the supports carries at least two differently color-sensitive layers, is used to record individual color components. Thus, the bipack may consist of a transparent support carrying a blue-sensitive photographic layer in which is incorporated a removable yellow dye such as Luxol yellow. Facing this front film, and in contact with it, is a second support coated with green-and-red-sensitive layers. In the preferred form a red sensitive photographic layer is coated on the support, over this is coated a water-permeable layer, such as gelatine, casein and the like, stained red with a removable dye such as Congo red or Carmosin M and on this is coated a green sensitive photographic layer. The latter emulsion is in contact with the emulsion surface of the front film and all sensitive layers are of the well-known silver halide gelatine emulsion type. Upon exposure to a natural or colored scene all color records are formed simultaneously: the blue record is formed in the emulsion layer of the front film, the green record is formed in the top layer of the rear film and the red record is formed in the lower layer. After exposure, the two films are given the usual processing treatment, such as development, fixation and washing which results in the formation of component color records in terms of metallic silver images in the different layers.

The record on the front film is an individual record and subsequently may be printed onto a suitable printing medium, such as a positive stock or duplicating stock film. The rear film now carries a series of two, superposed, color-component records in terms of metallic silver. A print, or intermediate record, is made of the superposed images onto a printing stock such as the well-known "positive" type of printing stock, however, the type of printing medium may be varied to suit the individual case. After printing the superposed images, the print is developed, fixing washed and dried. The baths used for the processing of this print are of the well-known types.

The characteristics of speed and contrast of the printing medium, the printing exposure and the development given the print may all be varied to obtain a satisfactory print. Such a print is one which, when placed in registered superimposition with the original negative, the details of the images of the individual films are cancelled out and the combined films present the appearance of a neutral deposit of even transparency. The desired quality of the positive print may also be described as that condition wherein the "gamma" of the print is approximately unity and all the silver densities of the image lie on the portion of the curve commonly known as the straight line portion of the characteristic curve of the printing medium. The former of these two methods of determining the satisfactory quality of the print is particularly convenient to the still photographer who is usually not equipped with sensitometric apparatus. The second method is particularly adaptable to the motion picture processing laboratory wherein the determination of the "gamma" of printing stock is a routine operation.

After the formation of the three initial, component color records and the intermediate record from the film carrying the superposed, component color record images, one of the superposed images is removed or eliminated from the multilayered film as will now be explained.

In the preferred form of this invention, an upper of several superposed images is removed, but, as will later be explained, it is also contemplated to remove the lower, or innermost layer, that is, the image positioned nearest the support carrying several superposed images. In carrying out the preferred treatment wherein an outer image is removed, the film carrying several superposed images is treated so as to convert the silver deposit into a form wherein it can be removed by solution in a silver salt solvent. As examples of the class of silver-salt formers, the following will serve to illustrate:

A

| | |
|---|---|
| Potassium ferricyanide_____grams__ | 35 |
| Ammonium hydroxide, concentrated__mls__ | 5 |
| Water to_____liter__ | 1 |

B

| | |
|---|---|
| Potassium ferricyanide_____grams__ | 2.3 |
| Potassium bromide_____do____ | 2.3 |
| Water to_____liter__ | 1 |

C

| | |
|---|---|
| Cupric bromide_____grams__ | 8.0 |
| Water to_____liter__ | 1 |

The silver image lying in the upper layer of the rear film is treated with a silver-salt former by any of the well-known means, which include, bathing, spraying, beading-on with rolls, felt rollers, etc. The silver-salt forming bath, commonly known as a "bleach-bath" is allowed to act for the time required to bleach the upper or outer layer. This bleaching time varies considerably, but in general, has been found to be about forty seconds. After bleaching the upper layer, the film is rinsed and then immediately transferred to a fixing bath, an example of which is as follows:

| | |
|---|---|
| Sodium thiosulfate, crystals_____grams__ | 250 |
| Potassium metabisulfite_____do____ | 15 |
| Water to_____liter__ | 1 |

After the silver salt image has been removed by the fixing bath, the film is washed and preferably dried.

The multilayer film, from which one of the component records has been removed, is now printed in registered contact with the intermediate record which was printed from the multilayer film before the removal of one of its component records. By printing these two records in combination there is formed a record representing the image which was removed from the multilayer film. After printing, the new printed record is formed according to the well-known processing steps of developing, fixing, washing and drying. If the original images on the multilayer film were those commonly recognized as "negative" images, the final record made by exposing through a print made from the original multilayered negative, in combination with the multilayered negative with one of the component records removed, results in a duplicate negative of the record removed by bleaching and fixing. The record remaining in the multilayered film is another of the component records while the record formed on the front film of the bi-pack is the third component color record. Thus, three individual color-component records are obtained from a modified bipack film subjected to the above described procedure of printing component records, removing one of the component records and "duping" off the bleached record from the composite print.

The foregoing steps in the novel process just described may be summarized in the following tabulation:

1. Original exposure on multilayered film carrying differently color-sensitized layers,
2. Development, fixing, washing and drying,
3. Making a print of the multilayered original,
4. Bleaching outer image of multilayered original,
5. Removing bleached image by silver salt solvent,
6. Washing and drying,
7. Making a print through print of original multilayered record in combination with multilayered record minus an outer image.

In a modification of the foregoing preferred exemplification, this invention also contemplates the separation of color-component records from multilayered films wherein all the images on the multilayered film are converted into a re-developed form, that is, into the form of a silver salt, and an outer image layer only is re-developed. Thus, any of the bleaching baths previously described may be used to bleach all the image layers. In using a ferricyanide bleach, no re-exposure of the bleached image is necessary before re-development. Since complete bleaching is herein desired, the time of the bleaching should be of the order of 2-4 minutes. After bleaching, the film is washed, and preferably dried, and then only the outer layer is re-developed. This may be accomplished by a number of means such as (a) using concentrated developers which will fully re-develop the outer image before the developer has had time to diffuse into the lower layers, or (b) the developer may be timed by trial tests to determine the time required to penetrate only the outer layer and development is then carried out for only this length of time, or (c) as has been well-known for many years, alcohol, glycerine, sugar and the like may be added to the developer to confine its action to the surface or outer layer. The amount of retarding agent may vary, but in general 20-40% has been found to be sufficient. A prefered formula for use in the foregoing modification of this invention is as follows:

| | |
|---|---|
| Sodium sulfite, anhy_____grams__ | 60.0 |
| Hydrochinon_____do____ | 4.9 |
| Sodium carbonate, anhy_____do____ | 48.0 |
| Metol _____do____ | 1.4 |
| Sugar_____do____ | 350.0 |
| Potassium bromide_____do____ | 1.6 |
| Water to_____liter__ | 1 |

The time of development required to re-develop only the outer image varies considerably depending on the characteristics of the gelatine used in making the emulsion and the treatment given the film during processing it to the original silver-image stage, but generally 1½ minutes at 68° F. has been found to produce satisfactory development. After re-developing an outer of several component images on a multilayered film, the lower or inner images are removed by a silver salt solvent, for example, a 25% solution of sodium thiosulfate and the film is then washed and dried. The following table indicates the steps required for the preparation of individual color component records from integrally superposed component records:

1. Original exposure on multilayered film carrying differently color-sensitized layers.
2. Development, fixing, washing and drying.
3. Making a print of the multilayered original.
4. Bleaching multilayered original.
5. Re-developing outer layer of original.
6. Removing lower layer of original.
7. Making a print through print of original in combination with original film with all but the inner layer redeveloped.

It is thus evident that the above described modification of the novel process previously set forth makes possible the removal or elimination of layers of images positioned beneath an outer image layer. This allows the outer image to be printed in optical contact, which effectively serves to minimize scatter and loss of image detail due to the separation caused by any intervening transparent layer.

In the present invention, the intermediate printing medium may be of the well-known unsensitized, "positive" emulsion or it may be sensitized to extend its sensitivity to those regions of the radiation spectrum lying beyond the visible range. Thus, if the printing emulsion is sensitized to the ultra-violet region, a source of ultra-violet radiation may be employed to expose through the combination intermediate record and multilayered film herein described. In like manner, the printing medium may be sensitized to long-red or infra-red radiation and infra-red rays may be used to print the combined records.

The herein described three color-component records can thus be used for the various color-photography processes which require three color-separation negatives. It is also contemplated, that the original exposure on the modified bipack need not be confined to an original scene but may also represent the printing exposure through a colored transparency as in the case of making separation negatives from additive color transparencies.

It is further contemplated that while the examples cited above in exemplification of the invention have been confined to bipack arrangements wherein one of the films carries at least two sensitive layers or coatings, it is also possible to apply to multilayered monopacks the process of preparing individual color component records by making a single-layered intermediate record of the superposed images, removing one of the superposed images, and re-forming the image removed by passing a printing exposure through the intermediate record in registered combination with the multilayered film minus one of the originally-formed images. In the case of a film comprising a support and at least three differently color-sensitive emulsion layers the above process is repeated twice to reform the images removed. The third image record being that one remaining on the multilayered film.

It is also contemplated that the various emulsion layers of a multilayered film may be separated by water-permeable layers of gelatine, or other water-dispersible proteins which may or may not be colored with removable filter dyes to aid in the spectral separation of the sensitive layers.

The herein described preferred embodiments are given in illustration and not in limitation of the invention which is intended to include all variations and modifications within the spirit and scope of the appended claims.

It is claimed:

1. A process for producing individual color-component records which comprises forming superposed color-component image records, printing an intermediate record of the superposed records, subjecting the superposed records to a non-hardening bleach bath until the outer image layer is converted into a silver salt, removing the silver salt in a fixing bath and subsequently reforming the eliminated record by passing a printing exposure through a combination of the intermediate record and the remaining record of the originally superposed record.

2. A process for producing individual color-component records which comprises forming superposed color-component image records in a bipack, printing an intermediate record of superposed green and red silver image record layers which form one element of the bipack the green layer being outermost, subjecting said layers to a nonhardening bleach bath until the green layer image record is converted into a silver salt, removing said silver salt in a fixing bath and subsequently reforming the eliminated record by passing a printing exposure through said intermediate record and the remaining red record onto a printing stock.

3. In a process for producing individual color-component records from an exposed and developed blue-green-red silver image record bipack film wherein green and red silver image record layers form one element of the bipack, the green layer being outermost; the steps which comprise printing an intermediate record of the superposed green and red silver image record layers and then subjecting them to a non-hardening bleach bath until the green layer image record is converted into a silver salt, removing said silver salt in a fixing bath and subsequently reforming the eliminated record by passing a printing exposure through said intermediate record and the remaining red record onto a printing stock.

VIRGIL B. SEASE.
DEANE R. WHITE.